United States Patent
Baier et al.

(10) Patent No.: US 10,345,790 B2
(45) Date of Patent: Jul. 9, 2019

(54) MODELLING METHOD AND SYSTEM

(71) Applicants: Patrick Baier, Rockville, MD (US); Hugh Bradley, Cambridge (GB)

(72) Inventors: Patrick Baier, Rockville, MD (US); Hugh Bradley, Cambridge (GB)

(73) Assignee: Siemens Industry Software Limited, Camberley (GB)

( * ) Notice: Subject to any disclaimer, the term of this patent is extended or adjusted under 35 U.S.C. 154(b) by 455 days.

(21) Appl. No.: 15/091,301

(22) Filed: Apr. 5, 2016

(65) Prior Publication Data
US 2017/0285615 A1 Oct. 5, 2017

(51) Int. Cl.
*G05B 19/4097* (2006.01)
*G06F 17/50* (2006.01)

(52) U.S. Cl.
CPC ......... *G05B 19/4097* (2013.01); *G06F 17/50* (2013.01); *G06F 17/5018* (2013.01); *G06F 2217/12* (2013.01)

(58) Field of Classification Search
CPC . G05B 19/4097; G06F 17/5018; G06F 17/50; G06F 2217/12
See application file for complete search history.

(56) References Cited

U.S. PATENT DOCUMENTS

| | | | |
|---|---|---|---|
| 5,581,672 A * | 12/1996 | Letcher, Jr. | G06T 17/00 345/420 |
| 2011/0285721 A1* | 11/2011 | Kilgard | G06T 11/203 345/442 |
| 2014/0375572 A1* | 12/2014 | Shanmugam | G06F 3/0484 345/173 |
| 2016/0055122 A1* | 2/2016 | Koranne | G02B 6/12011 703/2 |
| 2017/0017094 A1* | 1/2017 | James | G05B 19/4099 |

* cited by examiner

*Primary Examiner* — Ronald D Hartman, Jr.
(74) *Attorney, Agent, or Firm* — Lempia Summerfield Katz LLC

(57) ABSTRACT

A method of deriving an offset profile of a parametric curve includes generating an offset parametric curve corresponding to a received profile of the product represented as a parametric curve based on user input. If no self-intersections in a created spline approximation of the generated offset parametric curve are present, the process is terminated and the offset parametric curve is output as the offset profile of the parametric curve. If self-intersection is present for the spline approximation, the spline curve is split at one or more self-intersections and removed from the spline approximation of the offset parametric curve to form a modified spline approximation. Computing the self-intersections in the modified spline approximation is repeated until no self-intersection is present. The modified spline approximation of the offset parametric curve is then output as the offset profile of the parametric curve.

10 Claims, 6 Drawing Sheets

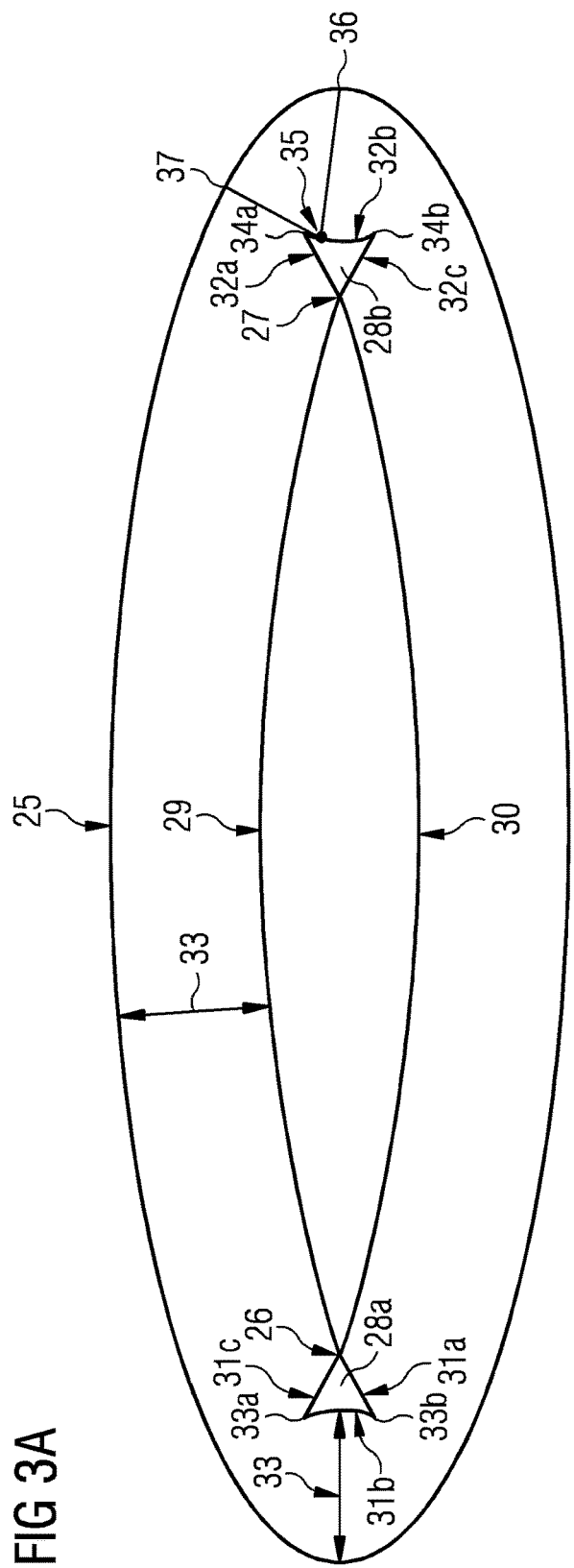

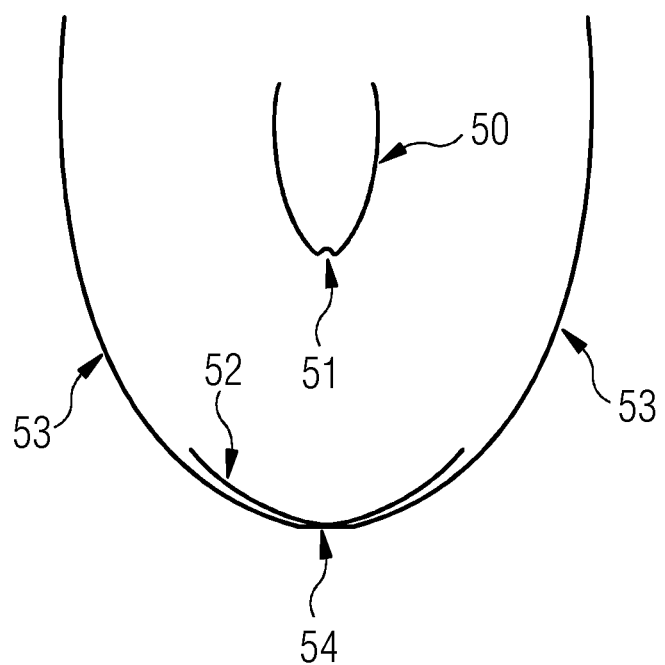

MODELLING METHOD AND SYSTEM

TECHNICAL FIELD

This present disclosure relates to the general field of computer aided design, drafting ("CAD"), manufacturing ("CAM") and visualisation systems (individually and collectively "CAD systems"), product lifecycle management ("PLM") systems, and similar systems, that manage data for products and other items (collectively, "Product Data Management" systems or PDM systems).

BACKGROUND OF THE DISCLOSURE

PDM systems manage PLM and other data. Improved methods and systems are desirable.

SUMMARY OF THE DISCLOSURE

Various disclosed embodiments include methods for creating non-intersecting offset profiles in a modelling system.

A method of deriving an offset profile of a parametric curve includes receiving in a data processing system a profile of a product represented as a parametric curve; receiving a user input including an offset relation to the parametric curve; generating an offset parametric curve corresponding to the received profile of the product represented as a parametric curve based on the user input; creating a spline approximation of the generated offset parametric curve; and carrying out a step of computing self-intersections in the created spline approximation. If no self-intersection is present for the spline approximation, the process is terminated and the offset parametric curve is output as the offset profile of the parametric curve. If a self-intersection is present for the spline approximation, the spline curve is split at one or more self-intersections; the one or more regions of self-intersection are removed from the spline approximation of the offset parametric curve to form a modified spline approximation; and the step of computing the self-intersections in the modified spline approximation is repeated until no self-intersection is present. The modified spline approximation of the offset parametric curve is then output as the offset profile of the parametric curve.

A data processing system includes a processor and an accessible memory. The data processing system is particularly configured to receive in the data processing system a profile of a product represented as a parametric curve; to receive a user input including an offset relation to the parametric curve; and to generate an offset parametric curve corresponding to the received profile of the product represented as a parametric curve based on the user input. A spline approximation of the generated offset parametric curve is created and a step of computing self-intersections in the created spline approximation is carried out. If no self-intersection is present for the spline approximation, the process is terminated and the offset parametric curve is output as the offset profile of the parametric curve. If a self-intersection is present, the spline curve is split at one or more regions of self-intersection; the one or more regions of self-intersection are removed from the spline approximation of the offset parametric curve to form a modified spline approximation; and, the step of computing the self-intersections in the modified spline approximation is repeated until no self-intersection is present. Then the modified spline approximation of the offset parametric curve is output.

A non-transitory computer-readable medium may be encoded with executable instructions that, when executed, cause one or more data processing systems to perform a method of deriving an offset profile of a parametric curve including receiving in a data processing system a profile of a product represented as a parametric curve; receiving a user input including an offset relation to the parametric curve; generating an offset parametric curve corresponding to the received profile of the product represented as a parametric curve based on the user input; creating a spline approximation of the generated offset parametric curve; and carrying out a step of computing self-intersections in the created spline approximation. If no self-intersection is present for the spline approximation, the process is terminated and the offset parametric curve is output as the offset profile of the parametric curve. If a self-intersection is present for the spline approximation, the spline curve is split at one or more self-intersections; the one or more regions of self-intersection are removed from the spline approximation of the offset parametric curve to form a modified spline approximation; and the step of computing the self-intersections in the modified spline approximation is repeated until no self-intersection is present. The modified spline approximation of the offset parametric curve is then output as the offset profile of the parametric curve.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

An example of method and system according to the present disclosure will now be described with reference to the accompanying drawings in which:

FIG. 3a illustrates a second example of an offset profile;

FIG. 3b illustrates a valid offset curve for the profile of FIG. 3a;

FIG. 5c illustrates the example of FIG. 5a, for a yet smaller feature.

DETAILED DESCRIPTION

Numerous advantages include, but are not limited to the method computing, or checking for, self-intersection of the spline approximation and using the result to determine whether any further processing, such as removing the regions of self-intersection and joining the remaining parts of the curve, is required before outputting the offset profile.

A method may iterate the steps until the computing self-intersections step finds no more self-intersections, whereupon the iteration stops. Inherently, the iteration stops after a finite number of rounds. Setting a hard limit for the total number of iterations could be done but risks leaving some self-intersections present.

A valid section of the spline approximation comprises a section which has no self-intersection.

The outputting of the method may comprise at least one of storing, or displaying, the offset parametric curve, or the modified spline approximation of the offset parametric curve. The parametric curve may comprise one of a curve in two dimensional (2D) space or a curve in three dimensional (3D) space that lies on a plane, or a parametric 3D surface. In combination with any of the disclosed embodiments, the method may further comprise using the output offset profile to generate manufacturing control instructions.

The data processing system is configured to produce an offset parametic curve which is always connected. The self-intersecting curve is removed and what remains is joined together and forms a continuous curve.

The embodiments of FIGS. 1 to 6 used to describe the principles of the present disclosure in this document are by way of illustration only and should not be construed in any way to limit the scope of the disclosure. Those skilled in the art will understand that the principles of the present disclosure may be implemented in any suitably arranged device, apparatus, system, or method.

Figure 1:
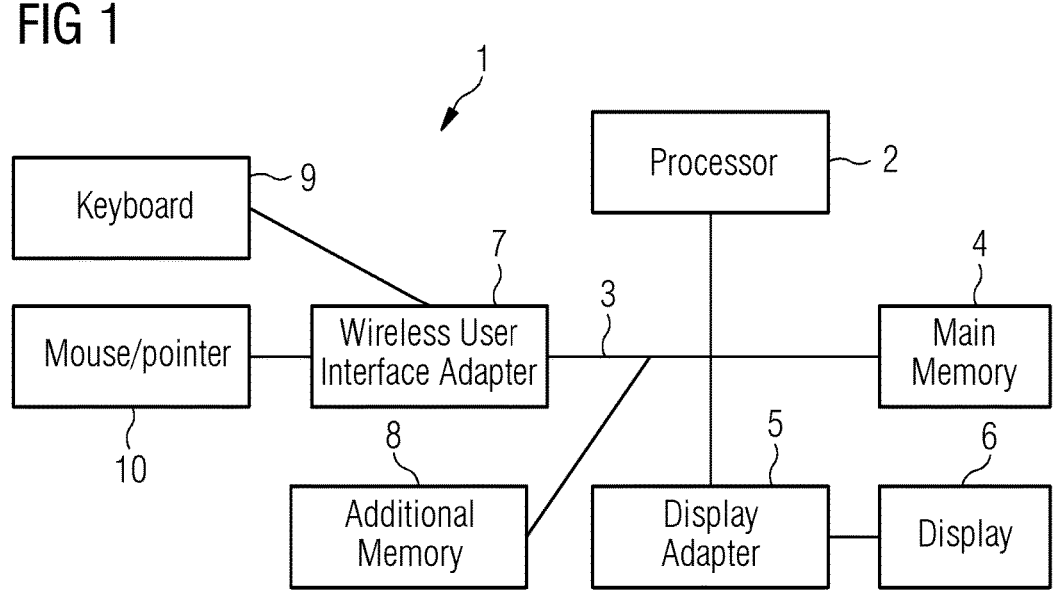
FIG. 1 is a block diagram of a data processing system in which an embodiment can be implemented.

FIG. 1 illustrates an example of a data processing system in which an embodiment of the present disclosure may be implemented, for example a CAD system configured to perform processes as described herein. The data processing system 1 comprises a processor 2 connected to a local system bus 3. The local system bus connects the processor to a main memory 4 and graphics display adaptor 5, which may be connected to a display 6. The data processing system may communicate with other systems via a wireless user interface adapter connected to the local system bus 3, or via a wired network, e.g. to a local area network. Additional memory 8 may also be connected via the local system bus. A suitable adaptor, such as wireless user interface adapter 7, for other peripheral devices, such as a keyboard 9 and mouse 10, or other pointing device, allows the user to provide input to the data processing system. Other peripheral devices may include one or more I/O controllers such as USB controllers, Bluetooth controllers, and/or dedicated audio controllers (connected to speakers and/or microphones). It should also be appreciated that various peripherals may be connected to the USB controller (via various USB ports) including input devices (e.g., keyboard, mouse, touch screen, trackball, camera, microphone, scanners), output devices (e.g., printers, speakers), or any other type of device that is operative to provide inputs or receive outputs from the data processing system. Further it should be appreciated that many devices referred to as input devices or output devices may both provide inputs and receive outputs of communications with the data processing system. Further it should be appreciated that other peripheral hardware connected to the I/O controllers may include any type of device, machine, or component that is configured to communicate with a data processing system. Further, systems may use other types of input devices to provide inputs for manipulating objects such as a mouse, pointer, touch pad, drawing tablet, track ball, joystick, keypad, keyboard, camera, motion sensing device that captures motion gestures, or any other type of input device capable of providing the inputs described herein.

In CAD systems, a user may wish to model a design for an object, generate manufacturing instructions for manufacturing that object, or make modifications to the design or manufacturing instructions. A sketch geometry manager (SGM) may be used to add a range of productivity tools to a 2D environment in design and manufacturing applications. The SGM may thus enhance the productivity of the 2D environment in 2D and 3D design and manufacturing applications. This is achieved by working with higher level geometric data structures to automatically generate higher level design changes. Examples include offsetting loops while inserting, extending and trimming edges, adding constraints to loops rather than to individual curves, and solving the shape of loops while maintaining their perimeter length or area.

An SGM can also be used in the control unit of an industrial manufacturing process, or as a component in specialised applications, e.g., architectural designs. CAD systems provide a graphical user interface (GUI) for interaction between the human user and the sketch geometry manager which is the engine performing the actual computations, the results of which are provided back to the user via the GUI. In practice, this may be implemented via a software library (shared object, or dll). Moreover, an SGM may be used in the control unit of a manufacturing machine.

A profile is a geometric figure constructed by joining up elementary geometric shapes such as bounded lines, bounded circular or elliptical arcs, or custom shaped (so-called "parametric") curves. Examples of a parametric curve include a curve in 2D space, or a curve in 3D space that lies on a plane, or on a parametric 3D surface. The application holds its definition by way of a function which can be queried by the SGM for any pair of parameters in its domain, and which will produce a point on that surface in 3D space as well as partial derivatives (a tangent plane) at that point. The SGM may be used to automatically create valid 2D offset profiles on points, lines, circles, ellipses, splines, general parametric curves, and offset curves. However, CAD systems which are used to create 2D offset profiles (i.e., offset profiles in the plane or on a 3D surface) need to be able to trim such offset profiles, that is, to remove any self-intersections from the offset profile, but there are some instances in which conventional trimming techniques cannot be used. The present disclosure relates to a class of self-intersections which cannot be reliably found and trimmed by existing algorithms because, even though the self-intersections are large, they originate from geometric features in the base profile that are too small (that is, smaller than resolution) to be detected by traditional curve-marching methods.

These types of self-intersection do arise in practical applications. A particular case of which is in manufacturing components which need holes cut to a particular shape and size, as explained in more detail below.

Figure 2:
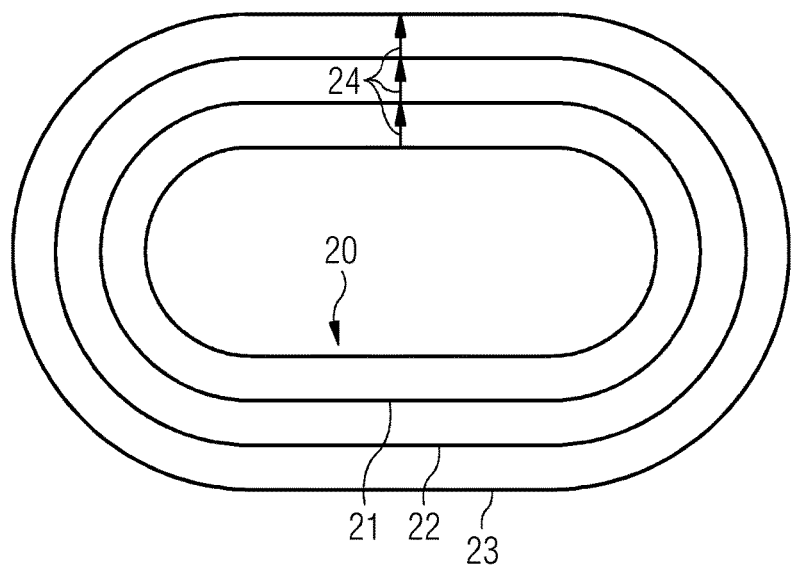
FIG. 2 illustrates a first example of an offset profile.

A basic example of an offset profile is the lines separating runner lanes of a race track on a typical sports ground. In SGM terms, each lane can be defined as a profile made up from two parallel bounded lines and two semi-circles. In FIG. 2, a base profile 20 and three offset profiles 21, 22, 23 are provided. In this example, the offset constraint or dimension is chosen to enforce a constant distance 24 between the base profile 20 and its offset profiles 21, 22, 23. This is an example of common offsetting functionality in CAD programs. The dimension values may be chosen to get constant width, as in this example, or chosen to get widths which are not equal, which is more generally the case.

A challenge in the creation of offset profiles is the fact that a non-self-intersecting base profile may have a self-intersecting offset profile. Even simple geometric shapes like ellipses may exhibit such self-intersecting offsets.

Figure 3B:
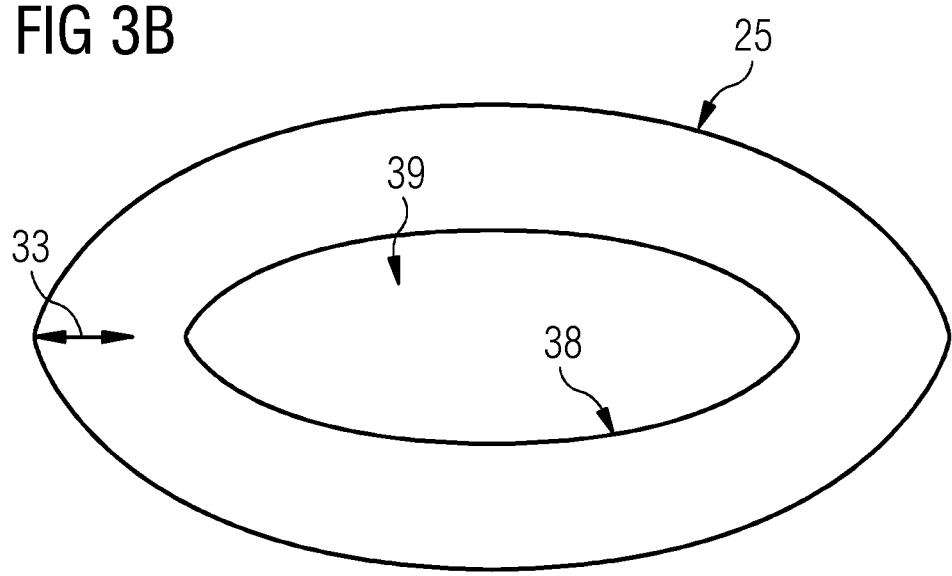
Figure 4:
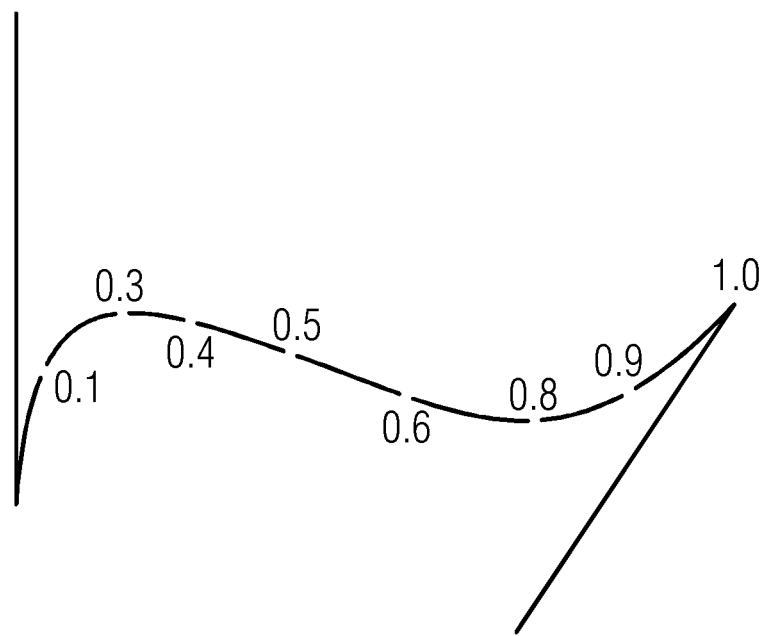
FIG. 4 illustrates a parametric curve to which the method of the present disclosure may be applied.

An example of this is illustrated in FIGS. 3a and 3b. Ellipse 25 has an offset giving a profile with self-intersections and cusps for a given offset distance 33. Thus the offset consists of several regions which start and end in self-intersection points or cusps: There are two intersection points 26, 27. These intersection points split the offset profile into three closed regions or "sub-loops". The central region or sub-loop is made up from the two offset segments 29 and 30. This region or sub-loop globally honors the offset distance 33: Every point along the segments 29, 30 has one unique point of closest approach in the base profile, and this point is distanced at precisely the offset distance 33. A valid section of the spline approximation comprises a section which has no self-intersection.

Thus, the sub-loop composed of the segments 29, 30 is a valid offset region. However, the same is not true for the two fish-tail shaped regions 28a, 28b to the left and to the right, respectively. Each of those two regions is made up from three segments. For the region at the intersection point 26, there are three segments 31a, 31b, 31c and for the region at the intersection point 27, there are three segments 32a, 32b, 32c. Each segment 31a, 31c, 32a, 32c is bounded by one intersection point 26, 27 and a cusp 33a, 33b, 34a, 34b, and the central segment 31b, 32b is bounded by the two adjacent cusps 33a, 33b, 34a, 34b. Each point along these two "fish-tails" has two points of locally closest approach in the base profile. One of them is positioned at exactly the offset distance 33 away, whereas the other has a smaller distance. For example, a point 35 lies inside one of the invalid regions. Point 35 is the offset of point 36 in the base profile 25 at offset distance 33, but point 35 actually approaches the base profile more closely, i.e. at a shorter distance, to point 37.

This gives rise to problems in real-life (e.g., engineering) applications because some of these regions may not be valid for a given application and need to be identified and treated so as to avoid manufacturing faults.

For example, one such industrial application is cutting elliptical holes in metal sheets. For elliptical holes having an outline given by the ellipses 25, in FIGS. 3a and 3b, it is common to use a two stage process where a fast, but less precise cutter, such as a plasma cutter, or laser cutter, cuts a first hole 39, which is smaller than the elliptical hole required, and then a second, slower but more precise filing tool files the first hole 39 down into the required elliptical shape 25. If the imprecise cutting tool is able to deviate from the ideal path by up to 0.1 units, then it might be programmed to follow an interior offset 33 at distance −0.1 of the desired final ellipse 25.

However, as can be seen in FIG. 3a, the elliptical profile 25 shows an example of a self-intersecting offset 26, 27 and it is clear that this raw offset profile violates the offset distance of −0.1, and so, would not be suitable for this use. An SGM may therefore offer a trimming capability to find and remove such self-intersections, as seen in the corresponding trimmed offset profile 38 of FIG. 3b, for elliptical profile 25.

An SGM may offer all common geometric shapes to applications for the construction of profiles. However, most industrial applications need the ability to use more complex, custom-shaped geometries for profile creation. These cannot be described in terms of simple geometries like arcs and lines etc. and may be specific to one particular customer model. Parametric curves may be needed to describe, for example, the cross-section of an aircraft wing or some similarly complex design.

The SGM does not usually control the shape of such curves. Parametric curves are defined inside the customer application (not the SGM) by means of an evaluation function $$t \in [0,1] \mapsto (x(t), y(t)) \in \mathbb{R}^2$$

As the (real-valued) parameter t moves from 0 to 1, the point f(t), given through planar coordinates x(t)- and y(t) as a function of t, traces out the shape of the parametric curve on the plane. See FIG. 4 for an example. The parameter range need not be [0, 1]. The SGM can ask the application for the coordinates of the point f(t), as well as derivatives, for any value of t∈[0, 1]. By stepping through the parameter interval [0, 1] in small increments, of, for example, 0.1 or 0.2, the SGM can get an approximate understanding of the curve shape held inside the customer application.

The SGM steps along parametric curves in sufficiently small increments to be able to perform any SGM operations, such as offsetting, or trimming, with sufficient precision to meet the customer requested accuracy. At the same time, the SGM avoids unnecessary refinement in its queries of the customer parametric in order to optimize performance However, there is a problem which may occur in any CAD system, with offsetting parametric curves. This is addressed by the present disclosure.

One way of viewing the creation of offset profiles is as a mechanism for increasing/up-scaling (in case of an "outer" offset) or decreasing/down-scaling (in case on an "inner" offset) geometric features in a base profile. It is possible that a base-profile may contain very small geometric features (smaller than the minimum resolution the SGM requires in order to be able to reliably detect such features), but these can still scale up to very large features in an offset profile (of the same size order as the offset profile itself), including self-intersections similar to the profile shown in FIG. 3a.

Figure 5A:
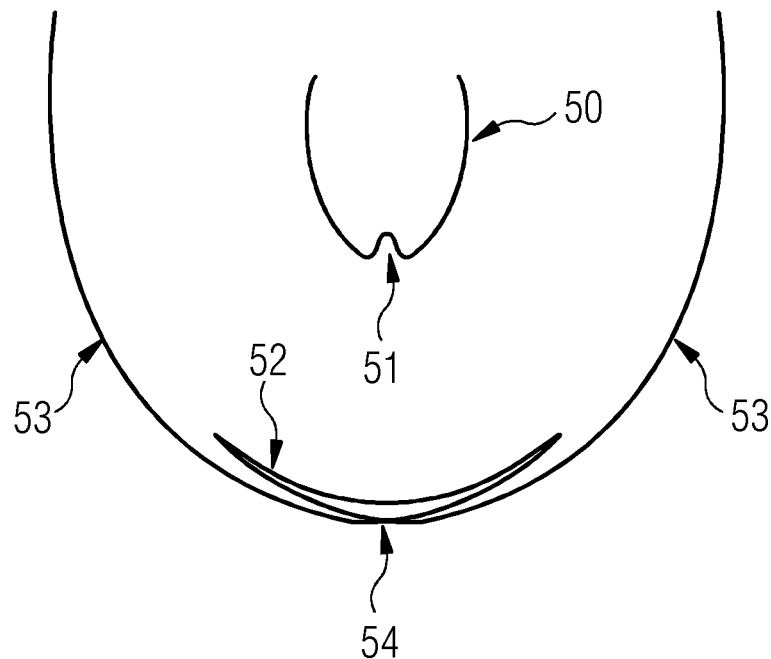
FIG. 5a illustrates a first example of parametric curve with a feature that produces self-intersection in the offset.
Figure 5B:
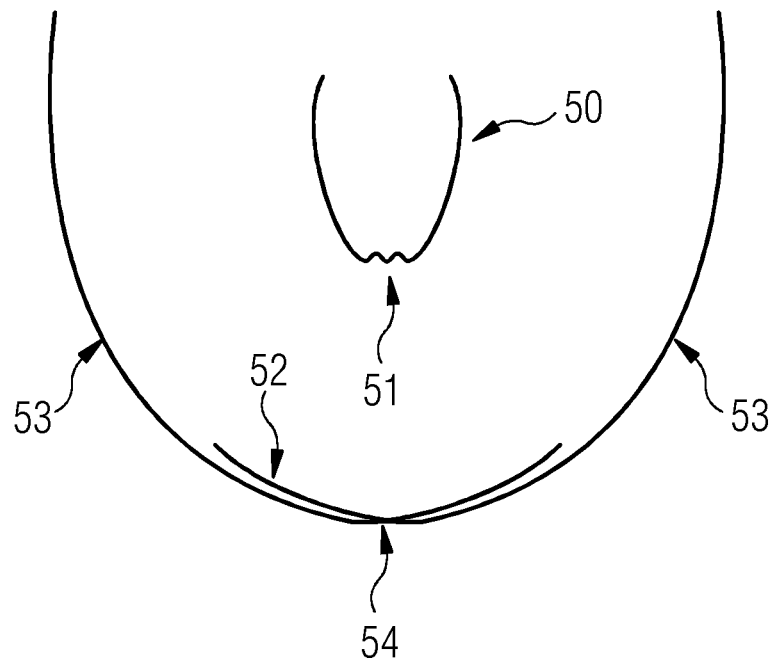
FIG. 5b illustrates the example of FIG. 5a, for a smaller feature.

As an example, FIG. 5a shows a base profile 50 with a small wave-shaped feature 51 in the profile. This feature 51 creates a large fish-tail shaped region 52 in the offset profile 53, due to self-intersection. The problem arises when the feature 51 in the base profile curve 50 approaches zero-size, because the self-intersection region 52 (the "fish-tail") in the offset profile 53 remains large and of roughly the same size. The fish tail 52 may become flatter and closer to the offset profile, as illustrated by FIGS. 5b and 5c, but the region of self-intersection 52 maintains its length.

The wave feature 51 in the base profile curve 50 has no cusps or corners, that is, its tangent direction never jumps, and its tangent vector is in fact uniformly bounded to a small angle around the horizontal as the feature scales down to zero. Hence this profile does not contain any (tangent direction) singularities.

The base profile 50 and offset profile 53 share the same parameterisation. As the wave-like feature 51 shrinks close to zero, it may ultimately only occupy a very small, sub-resolution, segment of the parameter space, but the same sub-resolution segment will still parameterize the large fish-tail shaped self-intersection 52 in the offset 53.

The fact that the "fish-tail" is traced out over just a tiny (smaller than resolution) segment of the parameter space (thus at very high speed), and that it remains large in actual space (the plane) is what causes the problem.

When trimming the offset, the SGM may never request the position and tangent direction of the base profile 50 for any parameter inside the tiny wave-feature 51, because this feature is generated by only a sub-resolution segment of the parameter space. The SGM avoids marching the base profile in steps that are smaller than resolution. Hence, this feature 51 may simply be stepped over and never detected when trimming. The consequence of this when converted to instructions for cutting and milling is that if the "fish-tail" is inside the material, rather than outside, too much material may be removed in the initial cut and the final shape of the cut and milled opening may not be correct.

The customer application may however ask the SGM for the shape of the offset profile 53 at a parameter inside the wave-like feature 51. Having failed to recognize that the part of the curve containing this parameter should be trimmed out from the offset profile, the SGM will thus provide positions inside this fish-tail shaped self-intersection 52 to the application. Features like these occur in real-life data, for example, due to poor accuracy of input data, rounding errors, or genuine tiny variations in geometric shapes.

Using traditional methods, the existence of such problematic tiny features in base profiles cannot be detected or even guessed other than by marching the entire curve in sufficiently small (sub-resolution) steps. In particular, it is not mathematically possible to "hone in" on any problem areas and perform such refined stepping only locally, if and where needed. Such methods of local refinement are sometimes called "finite element" or "divide and conquer" methods, but they cannot be used to address this issue. Thus, the traditional approach of detecting such self-intersections by marching and refining is practically impossible because the computational cost for doing so is prohibitive. The performance of offset trimming would become unacceptably slow.

Not all small wave-like features in base profiles cause offset self-intersections. This problem only results from geometric features with specific mathematical properties, but this does occur in "real-life" data, and not just as a mathematical construction.

As described in more detail hereinafter, the problem is addressed by replacing the offset parametric 52, 53 by a piecewise spline approximation that follows the original offset 52, 53. A spline is a curve that is piecewise polynomial and defined by its degree (the degree of the polynomials) and a set of control or interpolation points. One example of a spline approximation is choosing interpolation points along a curve. The spline will go through all interpolation points. The more interpolation points, the better the spline approximates to the curve.

This disclosure makes use of an efficient "divide and conquer" method for approximating parametric curves by splines to a required accuracy. The approximations may be refined locally where their accuracy is insufficient, until the approximating spline is uniformly as close to the original parametric curve as needed. Any intersections in the spline approximation can be reliably detected because splines are well-understood curves which are controlled by the SGM, rather than the application.

Figure 6:
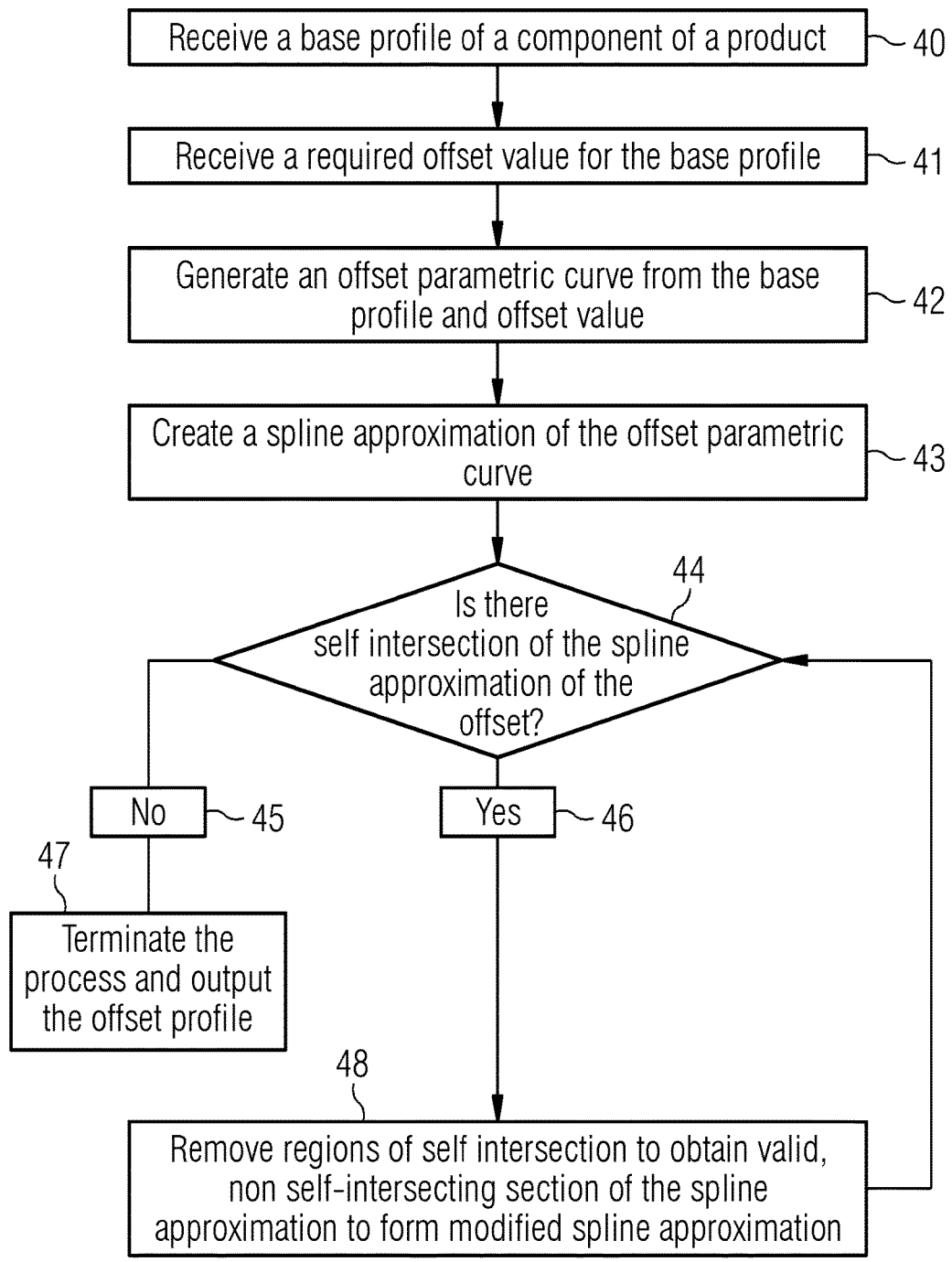
FIG. 6 is a flow diagram of a process in accordance with disclosed embodiments.

An example of a method of generating an offset parametric curve according to the disclosure is illustrated by the flow diagram of FIG. 6. The profile geometry manager receives 40 a base profile for a particular curve, which may be a component part of a product which is being modeled. The original profile typically comes from the application. A required offset relation, or offset value, for the base profile is also received 41. This offset value may be predefined and stored and applied according to certain conditions, or defined by the user at the time. With this offset value, a standard offset parametric is created 42, based on marching the base profile and querying its positions and derivatives at various parameters. Having created the offset parametric, then a corresponding spline approximation of the offset is created 43 in the SGM which approximates this offset parametric to sufficient accuracy, as requested by the application. A check is made 44 by self-intersecting the spline approximation to see whether there is a self-intersecting offset parametric of the profile. The result of computing the self-intersection in the spline approximation may have one of two possible outcomes.

The first is that there is no self-intersection 45 of the spline approximation, from which it can be concluded that there is no self-intersection of the offset parametric either and the process is terminated 47 and the offset profile, for example a parametric curve is output. This absence of self-intersection may be due to the spline approximation missing a tiny feature when marching the curve, but this still results in an offset profile which is free of self-intersection. In this case there is a non-intersecting offset profile and the algorithm terminates.

The second outcome is that there is self-intersection 46 of the spline approximation of the offset parametric, leading to the conclusion that that there is also self-intersection of the offset parametric curve. If the spline approximation algorithm steps into a tiny feature and does produce a self-intersection, for example, the spline approximation may approximate a fish-tail shaped self-intersection of the type shown in FIG. 5a to 5c, then steps must be taken to correct for this. The self-intersection can be reliably detected because the approximation is an SGM-controlled spline which the can be handled.

To deal with the self-intersection, an iterative process is entered, in which the spline curve is split at each intersection found, the self-intersecting region (in this example, the "fish-tail" 52, which starts and ends at the self-intersection 54, for example as shown in FIG. 5a, is removed 48 and the remaining valid pieces 53 of the approximation spline are joined together, forming a modified spline approximation. The joining is a standard process for splines and consists of creating a single spline parameter curve by merging the definitions of the two (or more) input curves so that a single continuous parametric curve is created.

The steps of this process 48, 44 are repeated until no more self-intersections are found, the process is terminated and the offset profile output 47. Although a hard limit could be set for the total number of iterations, this risks leaving some self-intersection present, so preferably, the steps are iterated until the computing self-intersections step finds no more self-intersections, whereupon the iteration stops. Thus a form of local trimming of a spline curve has been carried out, but unlike offset trimming, the local trimming is carried out without reference to an offset relation or curvature radius computations. Finally, the modified spline approximation may be output to the application. The outputting may comprise one of storing, or displaying, the offset parametric curve, or the modified spline approximation of the offset parametric curve. The output may be sent to a store for later use, or output as an image, or converted for use in controlling a machine, for example using the output offset profile to generate manufacturing control instructions.

In industrial manufacturing, it is common for complex assembly processes to interact in real time with a virtual sketch geometry manager providing advanced capabilities such as the features of this disclosure. The physical assembly devices communicate geometric information about the desired shape or geometry of an object, and the SGM processes this information and returns it to the assembly process which converts the results into machining instructions. Depending on the application, this can be implemented in various ways. The SGM may store virtual representations of the current and final shape of a mechanical part and provide instructions to the assembly process that will gradually build up the final design. In this case the SGM acts as the central control unit for the manufacturing process. The SGM may also be used in a more auxiliary role where a "snapshot" of the model is provided to the SGM, if and when needed, in which case the SGM produces a solution such as the output of the method of this disclosure, and then terminates and "forgets" the model. Both of these modes of operation may be used in practice.

There are algorithms for finding and trimming self-intersections in offset profiles in planes, but these existing algorithms do not work on the class of self-intersections considered here because their computational cost becomes prohibitive. Although, in theory, existing trimming algorithms could be used by more refined marching of curves, in practice this would be extremely inefficient and unacceptable to the user.

In summary, the disclosure provides a method which replaces a 2D offset profile on a plane or 3D surface by a sufficiently accurate spline approximation. Unlike the original offset profile, the spline approximation is controlled by a profile geometry manager, and self-intersections in such splines can be detected. An iterative process of spline surgery allows any self-intersections to be trimmed out of the spline approximation and the valid segments of the spline joined together, until a completely non-intersecting profile has been constructed. Reliably finding all self-intersections in offset profiles in the plane and trimming them in this way avoids problems when it comes to using the modeled profile offset for actual fabrication.

An operating system included in the data processing system enables an output from the system to be displayed to the user on display 6 and the user to interact with the system. Examples of operating systems that may be used in a data processing system may include Microsoft Windows™, Linux™, UNIX™, iOS™, and Android™ operating systems.

In addition, it should be appreciated that data processing system 1 may be implemented as in a networked environment, distributed system environment, virtual machines in a virtual machine architecture, and/or cloud environment. For example, the processor 2 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system 1 may vary for particular implementations. For example the data processing system 1 in this example may correspond to a computer, workstation, and/or a server. However, it should be appreciated that alternative embodiments of a data processing system may be configured with corresponding or alternative components such as in the form of a mobile phone, tablet, controller board or any other system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

The data processing system 1 may be connected to the network (not a part of data processing system 1), which can be any public or private data processing system network or combination of networks, as known to those of skill in the art, including the Internet. Data processing system 1 can communicate over the network with one or more other data processing systems such as a server (also not part of the data processing system 1). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, it is to be understood that when referring to a data processing system, such a system may be implemented across several data processing systems organized in a distributed system in communication with each other via a network.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 1 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle.

What is claimed is:

1. A method of deriving an offset profile of a parametric curve, the method comprising:
   receiving in a data processing system a profile of a product represented as a parametric curve;
   receiving a user input including an offset relation to the parametric curve;
   generating an offset parametric curve corresponding to the received profile of the product represented as a parametric curve based on the user input;
   creating a spline approximation of the generated offset parametric curve;
   carrying out a step of computing self-intersections in the created spline approximation;
   if no self-intersection is present for the spline approximation, terminating the process; and outputting the offset parametric curve as the offset profile of the parametric curve;
   if a self-intersection is present for the spline approximation, splitting the spline curve at one or more self-intersections; removing the one or more regions of self-intersection from the spline approximation of the offset parametric curve to form a modified spline approximation;
   repeating the step of computing the self-intersections in the modified spline approximation until no self-intersection is present, then outputting the modified spline approximation of the offset parametric curve as the offset profile of the parametric curve; and
   generating instructions for controlling a manufacturing process using the modified spline approximation; wherein the manufacturing process is controlled by the generated instructions.

2. A method according to claim 1, wherein the steps of claim 1 are iterated until the computing self-intersections step finds no more self-intersections, whereupon the iteration stops.

3. A method according to claim 2, wherein a valid section of the spline approximation comprises a section which has no self-intersection.

4. A method according to claim 2, wherein the outputting comprises at least one of storing, or displaying, the offset parametric curve, or the modified spline approximation of the offset parametric curve.

5. A method according to claim 2, wherein the parametric curve comprises one of a curve in two dimensional 2D space or a curve in three dimensional 3D space that lies on a plane, or a parametric 3D surface.

6. A method according to claim 1, wherein a valid section of the spline approximation comprises a section which has no self-intersection.

7. A method according to claim 1, wherein the outputting comprises at least one of storing, or displaying, the offset parametric curve, or the modified spline approximation of the offset parametric curve.

8. A method according to claim 1, wherein the parametric curve comprises one of a curve in two dimensional 2D space or a curve in three dimensional 3D space that lies on a plane, or a parametric 3D surface.

9. A data processing system comprising:
   a processor; and
   an accessible memory, the data processing system particularly configured to:
   receive in a data processing system a profile of a product represented as a parametric curve;
   receive a user input including an offset relation to the parametric curve;
   generate an offset parametric curve corresponding to the received profile of the product represented as a parametric curve based on the user input;
   create a spline approximation of the generated offset parametric curve;
   carry out a step of computing self-intersections in the created spline approximation;
   if no self-intersection is present for the spline approximation, terminate the process; and output the offset parametric curve as the offset profile of the parametric curve;
   if a self-intersection is present, split the spline curve at one or more regions of self-intersection; remove the one or more regions of self-intersection from the spline approximation of the offset parametric curve to form a modified spline approximation;
   repeat the step of computing the self-intersections in the modified spline approximation until no self-intersection is present, then output the modified spline approximation of the offset parametric curve; and
   generate instructions for controlling a manufacturing process using the modified spline approximation; wherein the manufacturing process is controlled by the generated instructions.

10. A non-transitory computer-readable medium encoded with executable instructions that, when executed, cause one or more data processing systems to:
    receive in a data processing system a profile of a product represented as a parametric curve;
    receive a user input including an offset relation to the parametric curve;
    generate an offset parametric curve corresponding to the received profile of the product represented as a parametric curve based on the user input;
    create a spline approximation of the generated offset parametric curve;
    carry out a step of computing self-intersections in the created spline approximation;
    if no self-intersection is present for the spline approximation, terminate the process and output the offset parametric curve as the offset profile of the parametric curve;
    if a self-intersection is present, split the spline curve at one or more regions of self-intersection; remove the one or more regions of self-intersection from the spline approximation of the offset parametric curve to form a modified spline approximation; repeat the step of computing the self-intersections in the modified spline approximation until no self-intersection is present, then output the modified spline approximation of the offset parametric curve as the offset profile of the parametric curve; and generate instructions for controlling a manufacturing process using the modified spline approximation; wherein the manufacturing process is controlled by the generated instructions.

* * * * *